United States Patent [19]

Krampe

[11] Patent Number: 4,905,373
[45] Date of Patent: Mar. 6, 1990

[54] SHEATHING-REMOVING TOOL FOR REMOVING INSULATION FOR A SINGLE OR MULTICONDUCTOR CABLE

[76] Inventor: Josef Krampe, An der Vogelrute 32, 4715 Ascheberg-Hebern, Fed. Rep. of Germany

[21] Appl. No.: 325,355

[22] Filed: Mar. 17, 1989

[30] Foreign Application Priority Data

Mar. 17, 1988 [DE] Fed. Rep. of Germany ....... 3808950
Dec. 30, 1988 [DE] Fed. Rep. of Germany ....... 3844278

[51] Int. Cl.$^4$ .................. B21F 11/00; B21F 13/00; H02G 1/12
[52] U.S. Cl. ........................................ 30/90.6; 81/9.4; 81/9.44
[58] Field of Search ................ 83/862; 30/90.1, 90.4, 30/90.6, 90.8, 91.1; 81/9.4, 9.41, 9.42, 9.43, 9.44, 9.51

[56] References Cited

U.S. PATENT DOCUMENTS

| | | | |
|---|---|---|---|
| 2,054,973 | 9/1936 | Ferguson | 81/9.4 |
| 2,120,398 | 6/1938 | Edwards et al. | 81/9.42 |
| 4,081,871 | 4/1978 | Knuth | 30/91.1 |
| 4,189,799 | 2/1980 | Litehizer, Jr. | 30/90.6 |
| 4,677,702 | 7/1987 | Cairns | 81/9.44 |
| 4,741,104 | 5/1988 | Noon | 81/9.41 |

Primary Examiner—Frank T. Yost
Assistant Examiner—Scott A. Smith
Attorney, Agent, or Firm—Michael J. Striker

[57] ABSTRACT

The sheathing-removing tool for removing insulation from a single or multiconductor cable comprises two jaws, which are hingedly connected with each other at common pivot axles foldable to form a hollow body for receiving the cable and which have cutting edges adjacent one end of the jaws for making a circular cut and a longitudinal incision. A section knife for removal of insulation from the individual conductors is located in the vicinity of the cutting edges for the circular cut on the long edges of the opposing jaws which press on each other when the jaws are closed. A slitting knife for making a longitudinal incision is located at the other end of the jaws opposite the cutting edges.

7 Claims, 2 Drawing Sheets

FIG.4
FIG.5
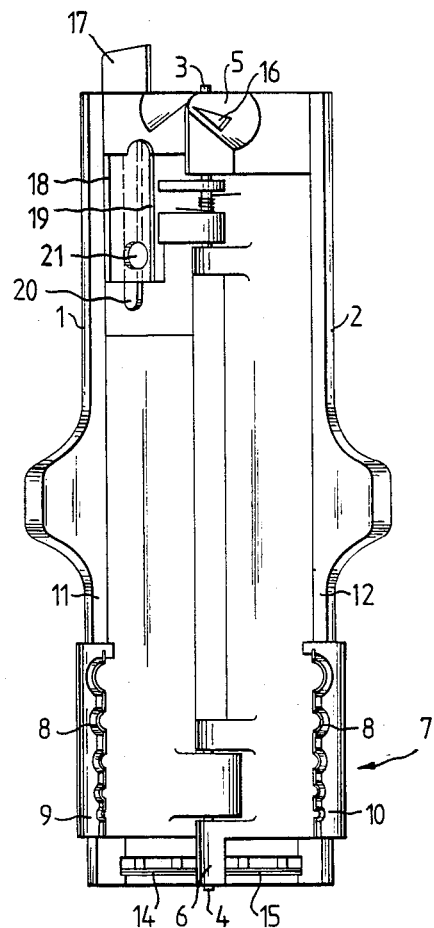
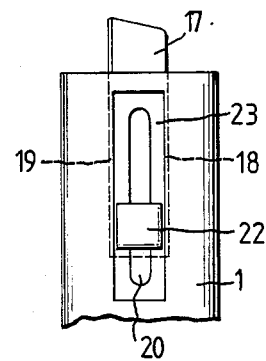

SHEATHING-REMOVING TOOL FOR REMOVING INSULATION FOR A SINGLE OR MULTICONDUCTOR CABLE

BACKGROUND OF THE INVENTION

The present invention relates to a tool for removing insulation from cable which has a single conductor or a plurality of wire conductors.

A sheathing-removing tool for removal of insulation from a single or multiconductor cable is known. It comprises two jaws, which are hingedly connected with each other at common pivot axles foldable in a hollow body for receiving the cable and which have cutting edges adjacent one end of the jaws for making a circular cut and a longitudinal incision. These jaws have mutually-opposing long edges parallel to the pivot axles which press on each other when the jaws are closed to form the hollow body. This known sheathing-removing tool also has an insulation removing device for the individual cable conductors. It comprises knife blades which are mounted protruding exteriorly on the jaws and engage above and below each other when the jaws move together.

This sheathing-removing tool is difficult to manipulate. Once the cutting edge on the one jaw is ready problems involved in control of the cutting process occur. Because of the one-sided arrangement the longitudinal incision always runs on the tool axis, which requires more expenditure of energy than necessary for the cutting process. Also the exteriorly-projecting knife blade for the circular cut is difficult to use and also it causes difficulties when it is carried, especially in a pocket of a user. Also the application of cutting forces from the exteriorly-protruding knife blade on the tool during insulation removal from the cable is inherently unstable.

SUMMARY OF THE INVENTION

Accordingly, it is an object of the present invention to provide a sheathing-removal tool for an electrical cable for removing outer sheathing in a longitudinal incision and insulation from individual cable conductors.

It is also an object of the present invention to provide a sheathing-removal tool which is easier to manipulate and carry than the current sheathing-removal tool, thus being more suitable for commercial purposes.

In keeping with these objects and with others which will become more apparent hereinafter, a cross sectional-cutting device for removal of said insulation from the cable conductors is mounted in the vicinity of the cutting edges for the circular cut on the mutually-opposing long edges of the jaws and a slitting blade for the longitudinal incision is located at the other end of the jaws opposite the cutting edges.

There are a variety of other embodiments possible within the general scope of the invention as defined in the above paragraph. The cross sectional-cutting device advantageously comprises two equal opposing knife halves with a plurality of receptacles, which are formed in the opposing long edges, the receptacles form a plurality of circular openings when the jaws are closed. The receptacles should in the best case have the smallest possible spacing from each other and a plurality of different sizes. The slitting blade can be mounted projecting into the hollow body transverse to the pivot axle near a hinged joint or pivot axle adjacent one end of the jaws.

A slidably mounted knife blade can be mounted in one jaw. The jaw having the knife blade is provided with an axially-elongated hole for slidably guiding and holding the knife blade and interiorly with a plurality of ledges. The jaw has an exterior depression surrounding the elongated hole on the jaw having the knife blade, in which a knob attached with the knife blade is slidable with the knife blade in the longitudinal hole.

BRIEF DESCRIPTION OF THE DRAWING

The objects, features and advantages of the invention will be made more apparent from the following detailed description, reference being made to the accompanying drawing in which:

FIG. 4 is a front view of another embodiment of a sheathing-removal tool for removing insulation from the cable according to the present invention folded together to form a hollow body.

FIG. 5 is a cutaway front view of a portion of the tool of FIG. 4 folded together with an extendible knife blade mounted in one of the jaws.

DETAILED DESCRIPTION OF THE INVENTION

Figure 1:
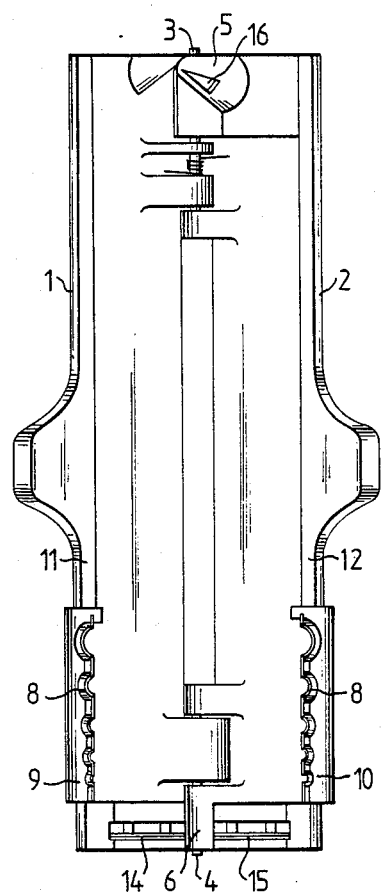
FIG. 1 is a front view of a sheathing-removing tool for removing insulation from a cable according to the present invention in an unfolded configuration
Figure 3:
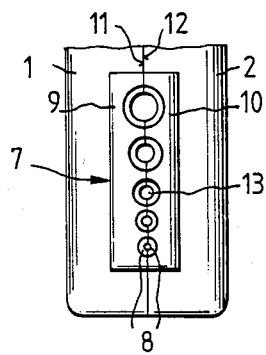
FIG. 3 is a cutaway front view of a portion of the tool of FIG. 1 where the cross sectional cutting device for the individual cable conductors is located.
Figure 2:
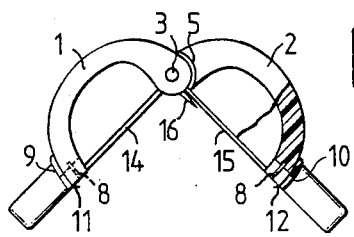
FIG. 2 is a top plan view of the tool shown in FIG. 1.

The jaws 1,2 of the cable sheathing-removing tool have in a conventional way a cross section with a partially cylindrical shape. Pivot axles 3,4 extending in the direction of the long edges of the jaws hingedly connect the individual jaws 1 and 2 at hinged joints 5,6. The jaws 1,2 connected pivotally on the pivot axles 3,4 are foldable together to form a hollow body. A cross sectional cutting device 7, seen in the lower portion of the drawing, is provided with a plurality of receptacles 8 on one end of the jaws 1,2. Comparision with FIG. 3 shows that it comprises two opposing knife halves 9,10 which are mounted exactly opposite each other on the long edges 11,12 of the opposing jaws 1,2 adjacent and pressing one each other when the jaws are closed to form the hollow body. Of course these long edges 11,12 extend parallel to the pivot axles 3,4. The receptacles 8 are provided in parallel with a series of different sizes. They form circular openings 13 when the jaws 1,2 are in their closed configuration, as can be seen by comparison with FIG. 3. The individual cable conductors are inserted in the openings 13 that fit them across the hollow body formed by closing the jaws 1,2. By rotation of the conductors in these openings 13 the insulation is cut by a circular cut or incision. In pulling the cable conductor from the opening 13 and of course across the axis of the hollow body, simultaneously the insulation is stripped away from the cable conductors. This shows that the sheathing-removing or stripping tool according to the present invention is especially easy to handle, particularly concerning cable insulation.

To remove the outer insulating sheathing from the cable it is necessary to expose the cable conductors. The sheathing-removing tool has cutting edges 14,15 on the jaws 1,2 immediately on the front end where the cross sectional cutting device 7 is located thus making it a multipurpose tool. A cable placed in the hollow body formed when the jaws 2,1 closed undergoes the circular cutting by the cutting edges 14,15 on rotation of the sheathing-removing tool about the cable conductors. After that however a longitudinal incision is still required for the complete cutting away or removal of the outer insulation. For this purpose the insulating-removing tool according to the invention is additionally equipped with a slitting blade 16. It is mounted on the end of the jaws 1,2 opposite the cutting edges 14,15 and directly on the pivot axle 3. Its blade edge projects into the hollow body because of its orientation perpendicular to the axis of the hollow body.

On making the longitudinal incision the cable is removed from it after opening the jaws 1,2 and inserted again in the jaws after a rotation of about 180°. Folding together the jaws 1,2 the slitting blade 16 is forced into the insulation and on drawing the cable out again the longitudinal incision is made. Which cut is made first is not important. However the circular cut may be performed first because the length of the insulation cut away is kept more exact that way. It is understood of course that the sheathing-removing tool can be rotated instead of the cable about 180°.

By mounting the slitting blade 16 directly in the pivot axle 3 it is guaranteed that the path of the incision or cut into the insulation is practically parallel to the cable conductor and/or runs true to the tool axis with minimal effort.

An additional feature of the present invention provides what is needed to complete the operation of insulation removal by the striping tool, i.e. the tool has an additional function. Thus a slidably mounted knife blade 17 is provided in the jaw 1 correlated with the ledges 18,19 on the inside of the jaw 1 and an elongated hole 20 is provided in the jaw 1. The knife blade 17 is guided slidably on the ledges 18,19, whereas it is slidable on the elongated hole 20. For this operation the knife blade 17 has a knob 22 attached with a pin 21 engaging through the elongated hole 20, which slides on the outside of the jaw 1 in a depression 23 surrounding the elongated hole 20. As the need requires the knife blade 17 may be slid out more or less from the jaw 1 for a cutting process and after the end of the cutting process it is again slid back. This cutting process may be necessary in connection with an insulation removal process.

In the embodiments described the sheathing-removing is a problem-free multipurpose tool, since it may not only remove the outer insulating-sheathing of the cable by a successive circular and a longitudinal incision, but also removes the insulation from the exposed cable conductors. This is significantly handier than the known tool.

It will be understood that each of the elements described above, or two or more together, may also find a useful application in other types of structures differing from the types described above.

While the invention has been illustrated and described as embodied in an insulation-removing tool for an electrical cable, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of the prior art, fairly constitute essential characteristics of the generic or specific aspects of this invention.

What is claimed as new and desired to be protected by Letters Patent is set forth in the appended claims.

I claim:

1. In a sheathing-removing tool for cutting sheathing from a single or multiconductor cable having at least one insulated cable conductor and for removing the insulation from said at least one cable conductor comprising two jaws, which are connected with each other by two common pivot axles foldable in a hollow body for receiving said single or multiconductor cable and which have a plurality of cutting edges adjacent one end of said jaws for making a circular cut in said sheathing and a slitting blade adjacent the other end of said jaws for making a longitudinal incision in said sheating, said jaws having mutually-opposing long edges parallel to said pivot axles, the improvement wherein a cross sectional cutting device for removal of said insulation from said at least one cable conductor is located on said long edges of said jaws adjacent said cutting edges for said circular cut.

2. The improvement defined in claim 1 wherein said cross sectional cutting device comprises two equal opposing knife halves with a plurality of receptacles, which are formed in said opposing long edges, said receptacles forming a plurality of circular openings on closing said jaws.

3. The improvement defined in claim 1 wherein said receptacles have the smallest possible spacing from each other and are a plurality of different sizes.

4. The improvement defined in claim 1 wherein said slitting blade is mounted projecting into said hollow body transverse to one of said pivot axle in the vicinity of said pivot axle.

5. The improvement defined in claim 1 further comprising a slidably-mounted knife blade mounted in one of said jaws for additional cutting processes.

6. The improvement defined in claim 5 wherein said one jaw having said knife blade is provided with an axially elongated hole for slidably guiding and holding said knife blade and interiorly with a plurality of ledges.

7. The improvement defined in claim 6 wherein said one jaw has an exterior depression surrounding said elongated hole on said jaw having said knife blade, on which a knob attached with sid knife blade is slidable with said knife blade in said elongated hole.

* * * * *